United States Patent [19]

Blangetti et al.

[11] Patent Number: 5,733,520
[45] Date of Patent: Mar. 31, 1998

[54] METHOD AND DEVICE FOR THE EXTRACTION OF THE CONDENSER EXHAUST GASES OF A BOILING WATER REACTOR

[75] Inventors: Francisco Blangetti, Baden; Alfredo Galvagno, Olten, both of Switzerland

[73] Assignee: Asea Brown Boveri AG, Baden, Switzerland

[21] Appl. No.: 585,785

[22] Filed: Jan. 16, 1996

[30] Foreign Application Priority Data

Feb. 3, 1995 [DE] Germany ............ 195 03 541.0

[51] Int. Cl.$^6$ .................. F01N 3/10; G21C 19/32; C01B 5/00
[52] U.S. Cl. ............ 423/580.1; 422/171; 422/173; 422/177; 422/188; 422/198; 422/211; 422/903; 476/DIG. 267; 476/DIG. 271; 376/301
[58] Field of Search .................. 422/171, 173, 422/188, 177, 211, 198, 903; 423/580.1; 376/300, 301; 976/DIG. 267, DIG. 378, DIG. 271

[56] References Cited

U.S. PATENT DOCUMENTS 4,228,132  10/1980  Weems ................ 422/174
4,430,292   2/1984  Shimada et al. ..... 423/580.1
4,780,271  10/1988  Dezubay ............. 376/300

FOREIGN PATENT DOCUMENTS 2226697   1/1973  Germany.
3031373   2/1982  Germany.
4125085   1/1993  Germany.
4221693  12/1993  Germany.

Primary Examiner—Hien Tran
Attorney, Agent, or Firm—Burns, Doane, Swecker & Mathis, L.L.P.

[57] ABSTRACT

In a boiling water reactor having two extraction systems, one in use and the other held as a backup, a method and apparatus for extracting condenser exhaust gases of the reactor include a preheater for heating condenser gases which are then used for heating a recombiner of the extraction system. Auxiliary steam from the turbine is directed to the preheater for heating the condenser gases. A bypass line bypasses a valve in the auxiliary steam pipeline from the turbine to the preheater. The operating extraction system receives heating steam through the auxiliary pipeline, while the backup extraction system has the valve in the auxiliary steam pipeline closed. The recombiner of the backup extraction system is kept heated by guiding steam through the bypass line to the preheater, where the steam expands and is thereby heated, and directing the expanded steam through a vent line to the recombiner.

6 Claims, 2 Drawing Sheets

METHOD AND DEVICE FOR THE EXTRACTION OF THE CONDENSER EXHAUST GASES OF A BOILING WATER REACTOR

FIELD OF THE INVENTION

The invention relates to a method and a device for the extraction of the condenser exhaust gases of a boiling water reactor of nuclear power stations.

BACKGROUND

In the reactor vessels of nuclear power stations, gamma irradiation of the water molecules produces, according to the following overall reaction, a certain quantity of hydrogen and oxygen in the stoichiometric ratio:

$$H_2O(l) \leftrightharpoons H_2(g) + \tfrac{1}{2}O_2.$$

The resulting gas mixture is called oxyhydrogen gas. When its detonation limit (approximately 7 mol % of $H_2(g)$) is reached, it explodes as a result of the catalytic action of certain metallic substances, and also as a result of sparking.

The steam from the reactor therefore contains a few parts per thousand of gases resulting from the breakdown of water, which is called radiolysis. In contrast to nuclear power stations of the pressurized water type, there is no separation between the water of the primary and secondary circuits in nuclear power stations having boiling water reactors, so that the steam flows through the turbine. After its expansion work, it enters the condenser. Because the pressure in the low-pressure turbine, i.e. before the condenser inlet, is already below ambient pressure, there is an unavoidable penetration of air into the condenser. The gas mixture entering the latter therefore primarily consists of steam, the radiolysis gases and ambient air.

As a result of the stripping of the mixture which takes place during condensation, the concentration of the uncondensable component increases along the condensation path. The concentration of the oxyhydrogen gas is thereby increased. For reasons of safety, systems of this type are designed in such a way that the final concentration at the outlet of the condenser does not exceed the value 0.04 mol % of $H_2(g)$.

A recombiner is arranged between the vacuum pump and the condenser so that the concentration of the oxyhydrogen gas, i.e. the danger of explosions, does not increase in this vacuum pump as well. This catalyst-filled container converts the hydrogen and oxygen into water by catalytic combustion, specifically under controlled conditions and below the detonation limit. Since this reaction is highly exothermic, the catalyst does not require any extraneous heating in normal operation.

In order to ensure recombination even with very dilute gas mixtures, and to accelerate the reaction on start-up, the catalyst is, nevertheless, preheated. This is done using a so-called preheater arranged upstream of the recombiner. This preheater heats the gases leaving the condenser before they are fed into the recombiner, this being achieved by heat exchange inside the preheater with heating steam diverted from the turbine.

For reasons of safety, such a device must have a redundant design. For this reason, in addition to the first extraction system, there is always a second extraction system in stand-by, which can be switched to as required. In order for the catalyst to be ready for use when switching over, the recombiner of the respective redundant system must also, of course, be continuously preheated to a temperature of approximately 150° C. In the stand-by state, this task is undertaken by an electrical heating system. For this purpose, it is necessary either to fit electrical windings or to equip the recombiner, the preheater and the adjacent components with an electrically-heated jacket.

However, such an electrical heating system has a large number of disadvantages. It must be grounded and externally insulated, which results in high costs in addition to a complex structure. In addition, there is the latent danger of sparking due to damaged heating elements. Since the heat is transferred inward virtually exclusively via lines, this takes a relatively long time and also leads to a nonuniform heat distribution. Finally, because of the multiplicity of the inputs and outputs of the heated components, the electrical heating system must have a separate power supply, which makes both assembly and disassembly of the extraction system considerably more difficult.

After the boiling water reactor has been switched over to the second extraction system, it is an essential requirement for it to be possible to preheat the catalyst of the first extraction system. An electrical heating system is therefore obviously required for this extraction system as well. However, the outlay and the concomitant costs are therefore further increased.

SUMMARY OF THE INVENTION

Accordingly, one object of the invention is to avoid all these disadvantages by providing a novel, simple, cost-effective and reliable device for the extraction of condenser exhaust gases of a boiling water reactor. A further intention is to specify a method for operating the device.

According to the invention, this is achieved in that, in a device according to the invention, a bypass bypassing the shutoff element of the auxiliary steam pipeline is arranged at this shutoff element. A throttle element is arranged, downstream of the vent orifices, in the vent tube. The vent tube is functionally connected to the recombiner.

The advantages of the invention are based on the fact that the catalyst of the second extraction system, which is in the standby state, can be heated using a less expensive heat source, specifically the heating steam which is in any case present at the auxiliary steam pipeline. The electrical heating system can therefore be omitted, which leads to a simple, cost-effective and reliable device for the extraction of condenser exhaust gases. In addition, the heat transfer within the preheater takes place exclusively by forced convection and in direct contact, so that the process runs substantially faster and more uniformly.

It is particularly expedient for the throttle element to be designed as a multiple throttle, consisting of a series circuit of orifices arranged off-center. With such a multiple throttle, the heating steam is fed through the orifices in meander fashion, and therefore undergoes particularly strong deceleration. In this way, the pressure of the heating steam located in the preheater can be better reduced to the pressure prevailing in the recombiner.

When the boiling water reactor is operated using the first extraction system, a small quantity of heating steam is continuously fed past the shutoff element arranged in the auxiliary steam pipeline of the second extraction system and fed into the preheater. This heating steam is strongly heated in the preheater by expansion and then throttled to the pressure prevailing in the recombiner. The strongly heated heating steam is fed into the recombiner and therefore preheats the latter. The heating steam is then condensed in the downstream-connected exhaust gas condenser and fed back from there into the main condenser.

The heating steam expands in the preheater by approximately two orders of magnitude, which causes it to be very strongly superheated. Even temperatures of approximately 170° C. can thereby be reached. For this reason, the entire extraction system which is in the stand-by state remains dry and can advantageously be flushed with hot steam. When the boiling water reactor is switched over to the second extraction system, the high temperature of the preheated catalyst also ensures immediate recombination of the radiolysis gases and therefore prevents concentration of the oxyhydrogen gas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which represent an exemplary embodiment of the invention with the aid of the extraction systems for the condenser exhaust gases of a boiling water reactor, and wherein.

Figure 1:
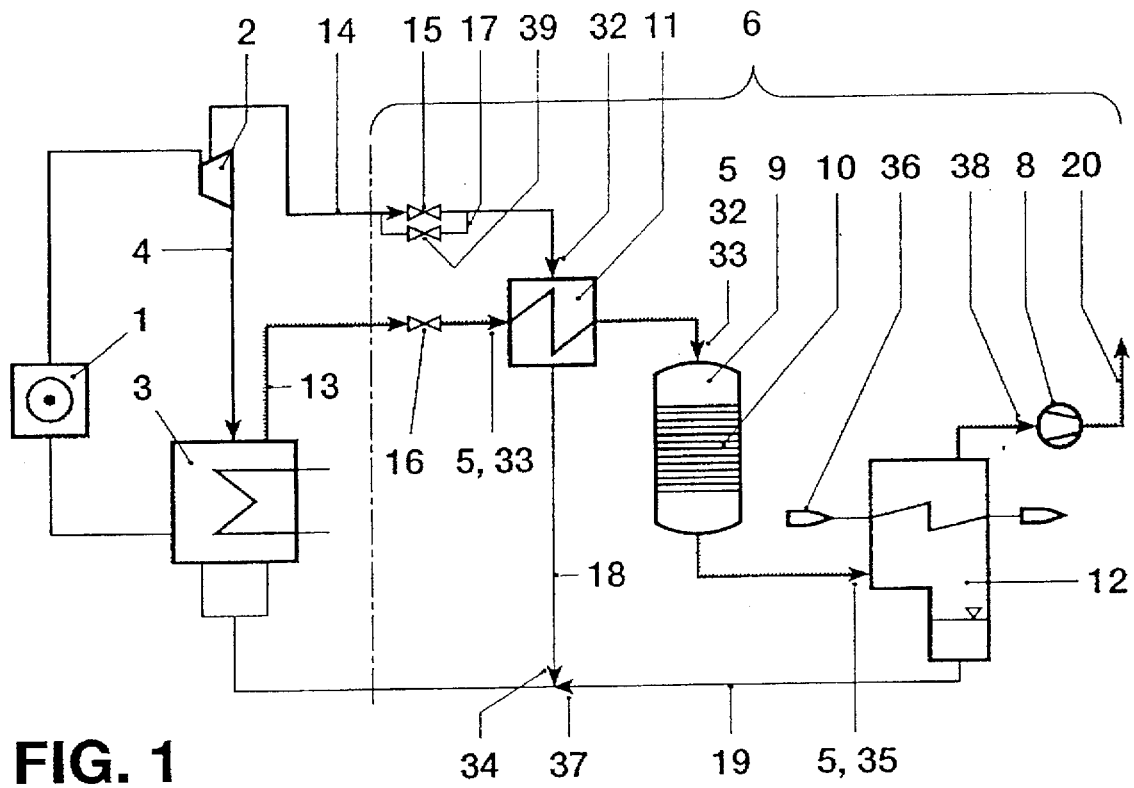
FIG. 1 shows a schematic representation of the first, actively operated, extraction system.

Only those elements which are essential for understanding the invention are shown. The flow direction of the working medium is indicated with arrows.

DESCRIPTION OF THE PREFERRED EMBODIMENTS

Referring now to the drawings, wherein like reference numerals designate identical or corresponding parts throughout the several views, a turbine 2 and a main condenser 3 are connected to the boiling water reactor 1 of a nuclear power station and are connected to each other by an exhaust steam line 4. In order to extract the condenser exhaust gases 5, the main condenser 3 is connected to a first extraction system 6 and to a second extraction system 7, one of which is continuously in operation and the other of which is in stand-by as a backup. Both extraction systems 6, 7 have the same design.

FIG. 1 represents the first extraction system 6, which is in operation. It consists of a vacuum pump 8 which is connected via a $H_2$—$O_2$ recombiner 9, which contains a platinum-palladium catalyst 10, to the main condenser 3. A preheater 11 is connected upstream of the recombiner 9 and an exhaust gas condenser 12 is connected downstream of the recombiner 9. The preheater 11 is connected via an extraction line 13 to the main condenser 3 and, via an auxiliary steam pipeline 14, to the turbine 2. A shutoff element 15, 16, designed as a control valve, is respectively arranged both in the auxiliary steam pipeline 14 and in the extraction line 13. The control valve 15 located in the auxiliary steam pipeline 14 has a bypass 17. One condensate line 18, 19 runs in each case from the preheater 11 and from the exhaust gas condenser 12 to the main condenser 3. The extraction line 13 leads, starting from the main condenser 3, through the preheater 11, the recombiner 9, the exhaust gas condenser 12 and the vacuum pump 8, to an exhaust gas outlet 20.

Figure 2:
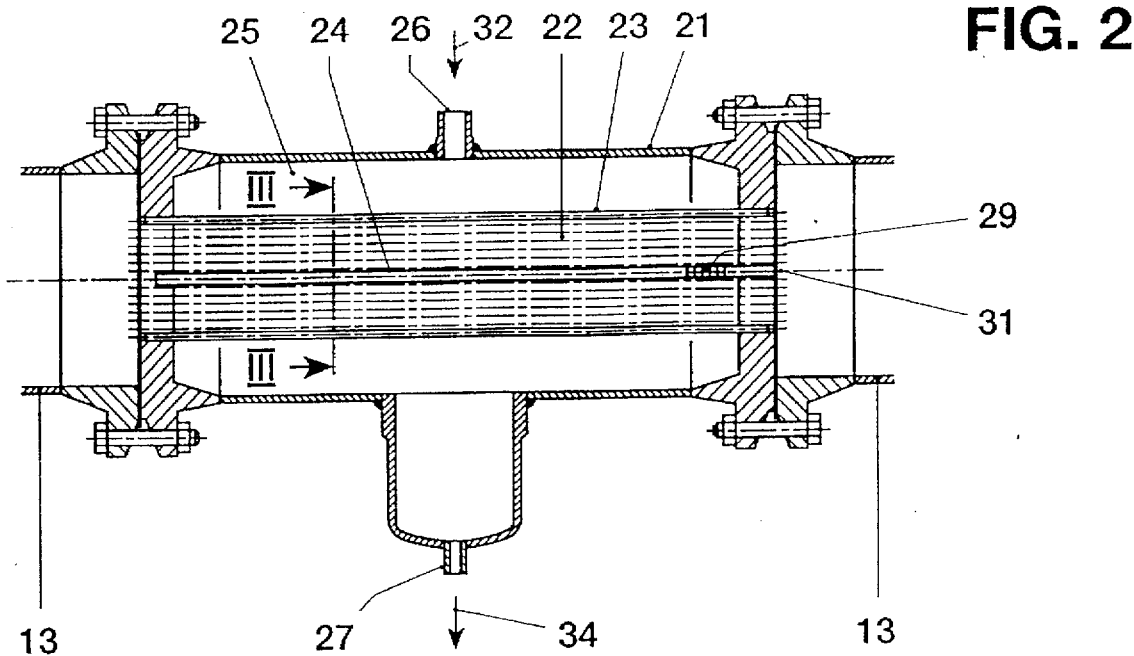
FIG. 2 shows a longitudinal section of the preheater.
Figure 3:
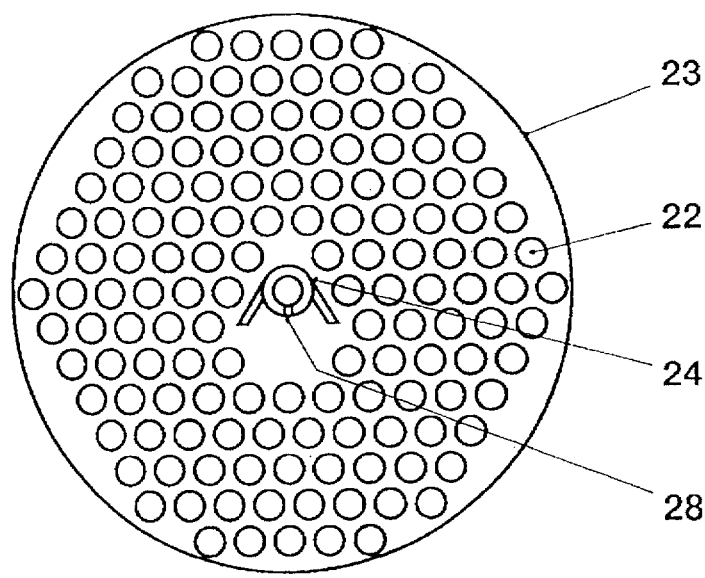
FIG. 3 shows section III—III through the vent tube and the transfer tube of the preheater, according to FIG. 2, on an enlarged scale.
Figure 4:
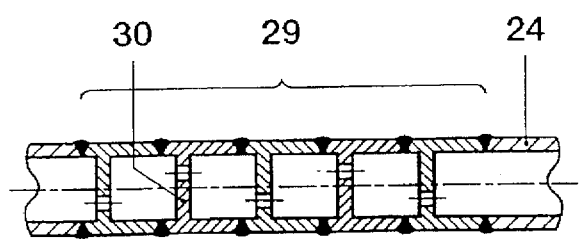
FIG. 4 shows an enlarged representation of the multiple throttle shown in FIG. 2.

The preheater 11 consists of a cylindrical housing 21 which is connected at both ends to the extraction line 13 (FIG. 2). A tube bundle 23, consisting of a plurality of coaxially arranged heat exchange pipes 22, is arranged inside the housing 21. The heat exchange pipes 22 extend as far as both ends of the housing 21 and receive a central vent tube 24. A steam distribution space 25, which is connected via a heating steam inlet 26 to the auxiliary steam pipeline 14 and, via a condensate outlet 27, to the condensate line 18, is constructed inside the housing 21 and annularly around the tube bundle 23. A plurality of vent orifices 28, which connect the vent tube 24 to the steam distribution space 25, are constructed in this vent tube 24 (FIG. 3, FIG. 2). A throttle element 29, designed as a multiple throttle, is arranged downstream of the vent orifices 28 in the vent tube 24. This multiple throttle 29 consists of a series circuit of orifices 30 arranged off-center (FIG. 4). The vent tube 24 is closed in the direction of the main condenser 3, but has an opening 31 toward the recombiner 9 (FIG. 2).

During operation of the boiling water reactor 1, both the main condenser 3 and the turbine 2 are continuously functionally connected to one of the two extraction systems 6, 7. If the first extraction system 6, as already described above, is active, its control valves 15, 16 are open (FIG. 1). The control valves 15, 16 of the second extraction system 7 then remain closed (FIG. 5).

As a result, heating steam 32 enters the preheater 11 of the first extraction system 6 via the auxiliary steam pipeline 14, and condenser exhaust gases 5, which entrain radiolysis gases 33, amongst other things, with them, enter the preheater 11 of the first extraction system 6 via the extraction line 13. In this preheater, the condenser exhaust gases 5 cooled in the main condenser 3 to approximately 50° C. are reheated by heat exchange with the heating steam 32 diverted from the turbine 2, and thus reach a temperature of above 150° C. This being the case, the heating steam 32 condenses and a condensate 34, which is fed back via the condensate line 18 to the main condenser 3, is formed. Subsequently, both the condenser exhaust gases 5, including the radiolysis gases 33, which are now heated, and the heating steam 32 not condensed in the preheater, enter the recombiner 9 via the extraction line 13. Because of the high temperatures prevailing in this recombiner, catalytic combustion of most of the radiolysis gases 33 contained in the condenser exhaust gases 5 to give water takes place in spite of the short residence time. The resulting steam 35 is, together with the residual condenser exhaust gases 5, fed into the exhaust gas condenser 12 via the extraction line 13. Further heat exchange with the water used as coolant 36 takes place in this condenser. This being the case, a further condensate 37 results, which is likewise fed back to the main condenser 3 via the condensate line 19. The relatively low proportion of exhaust gases 38 which then remains is extracted by the vacuum pump 8 and discharged to the ambient air via the exhaust gas outlet 20.

Figure 5:
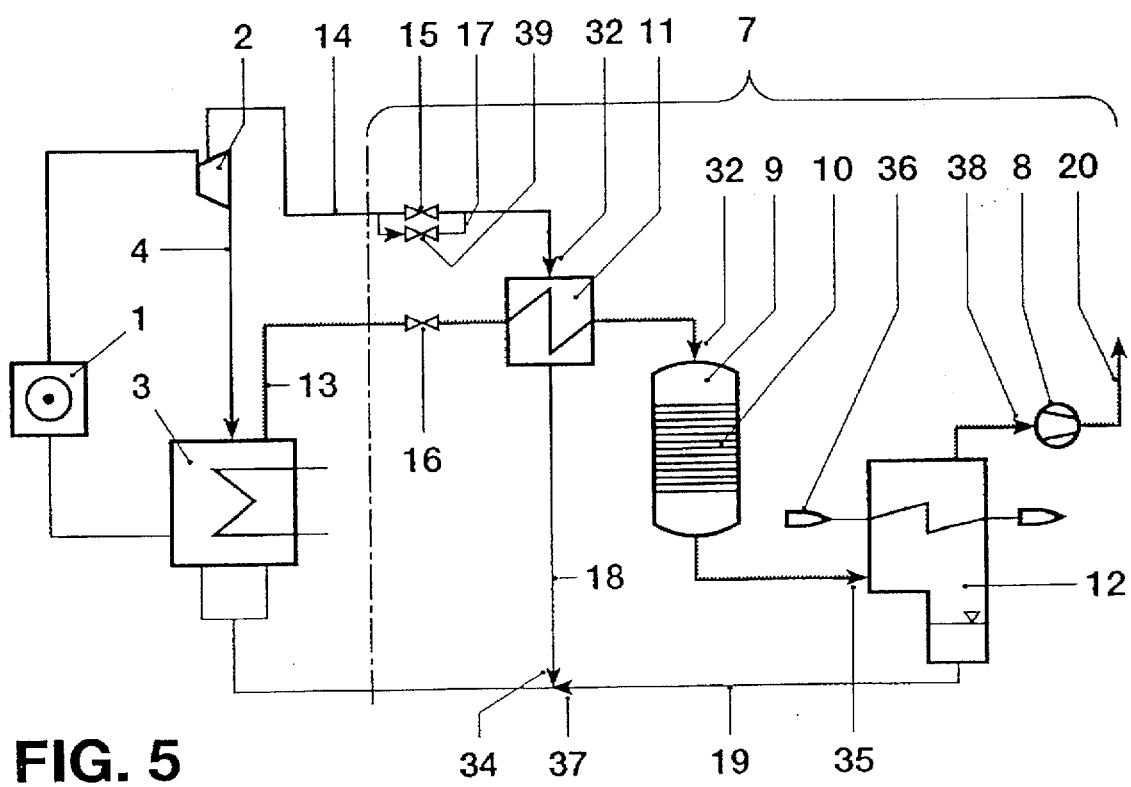
FIG. 5 shows a schematic representation of the second extraction system, which is in the stand-by state.

During this, the second extraction system 7, which is in the stand-by state, continuously receives a small quantity of heating steam 32 via its bypass 17 from the auxiliary steam pipeline 14 (FIG. 5). For this purpose, the bypass 17 is designed in such a way that it allows approximately 5 grams of heating steam 32 per second to pass through. To this end, a control valve 39 may also be arranged in the bypass 17. The pressure of the heating steam 32 present at the auxiliary steam pipeline 14 is equal to approximately 10 to 15 bar. After it has entered the preheater 11, the heating steam 32 expands through the vent orifices 28 and is throttled by the multiple throttle 29 to the pressure prevailing in the recombiner 9. Because of the orifices 30 multiply arranged one after another and off-center, the heating steam 32 is fed in meander fashion through the throttle element 29 and therefore undergoes particularly strong deceleration. When it expands by two orders of magnitude, the heating steam 32 is superheated very strongly and reaches a temperature of above 150° C. With this temperature, the catalyst 10 of the second extraction system 7 is continuously preheated, so that recombination of the radiolysis gases 33 is immediately ensured when switching over to this extraction system 7.

The strongly heated heating steam 32 is condensed in the downstream-arranged exhaust gas condenser 12 and the condensate 37 is fed back into the main condenser 3.

If it is intended to switch the boiling water reactor 1 over to the second extraction system 7, it is merely necessary to close the control valve 15, 16 of the first extraction system 6 and simultaneously to open the control valves 15, 16 of the second extraction system 7.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for the extraction of condenser exhaust gases of a boiling water reactor having two identical extraction systems, one of which held in stand-by as a backup, each extraction system comprising:

a preheater connected by an auxiliary steam pipeline to receive heating steam from a turbine of the boiling water reactor and connected via an extraction line to receive condenser exhaust gas from a main condenser of the boiling water reactor, a first shutoff element arranged in the auxiliary steam pipeline to control a flow therethrough, a bypass line, connected to the auxiliary stem pipeline for bypassing the first shutoff element, a second shutoff element arranged in the extraction line to control a flow therethrough, a vent tube disposed inside the preheater and having orifices for venting heating steam from of the auxiliary steam pipeline, a throttle element arranged in the vent tube downstream of the vent orifices to throttle heating steam flowing through the vent tube, an $H_2$—$O_2$ recombiner with integrated catalyst, connected downstream of the preheater to receive heated condenser exhaust gases, wherein the vent tube is functionally connected by an opening to deliver vented heating steam to the recombiner, and an exhaust gas condenser connected downstream of the recombiner to receive exhaust gas of the recombiner and a vacuum pump connected to the condenser to draw exhaust gas therethrough.

2. The device as claimed in claim 7, wherein the throttle element is a multiple throttle.

3. The device as claimed in claim 2, wherein the multiple throttle includes a series circuit of orifices which are arranged off-center.

4. The device as claimed in claim 7, wherein a control valve is arranged in the bypass line.

5. A method for the extraction of condenser exhaust gases of a boiling water reactor having two identical extraction systems for alternative operation, comprising the steps of:

operating a first extraction system and holding a second extraction system in stand-by as a reserve, wherein a first shutoff element controlling a flow of heating steam from a turbine of the boiling water reactor and a second shutoff element controlling a flow of exhaust gases from a main condenser of the boiling water reactor to the first extraction system are opened and corresponding shutoff elements of the second extraction system are closed, directing exhaust gases from the main condenser into a preheater of the first extraction system for preheating the exhaust gases by heat exchange with heating steam from the turbine and fed into the preheater of the first extraction system;

heating a recombiner of the first extraction system with the heated condenser exhaust gases, simultaneously feeding a portion of the heating steam into a preheater of the second extraction system, wherein the portion of heating steam is heated in the preheater of the second extraction system by expansion and is subsequently throttled to a pressure prevailing in a recombiner of the second extraction system, feeding the heated heating steam into the recombiner of the second extraction system for preheating the recombiner of the second extraction system, condensing the heating steam exhausted from the recombiner of the second extraction system in a downstream exhaust gas condenser of the second extraction system, and feeding condensate from the exhaust gas condenser of the second extraction system to the main condenser.

6. The method as claimed in claim 8, wherein the portion of heating steam fed into the preheater of the second extraction system is directed through a bypass parallel to a first shutoff element arranged in an auxiliary steam pipeline of the second extraction system.

* * * * *